US012677729B2

(12) United States Patent
Parrein

(10) Patent No.: US 12,677,729 B2
(45) Date of Patent: Jul. 14, 2026

(54) PLANTING DISC FOR A DISC PLANTER

(71) Applicant: AGRIPLANT NV, Langemark (BE)

(72) Inventor: Bart Parrein, Langemark (BE)

(73) Assignee: AGRIPLANT NV, Langemark (BE)

( * ) Notice: Subject to any disclaimer, the term of this patent is extended or adjusted under 35 U.S.C. 154(b) by 322 days.

(21) Appl. No.: 18/415,064

(22) Filed: Jan. 17, 2024

(65) Prior Publication Data

US 2024/0251700 A1      Aug. 1, 2024

(30) Foreign Application Priority Data

Jan. 27, 2023    (BE) .................................... 2023/5054

(51) Int. Cl.
*A01C 11/00*              (2006.01)
(52) U.S. Cl.
CPC .................................. *A01C 11/006* (2013.01)
(58) Field of Classification Search
CPC .............................. A01C 11/006; A01C 11/02
See application file for complete search history.

(56) References Cited

U.S. PATENT DOCUMENTS

| | | | |
|---|---|---|---|
| 2,348,787 A | 5/1944 | Cordes | |
| 4,074,830 A | * 2/1978 | Adams | A01C 7/046 |
| | | | 221/266 |
| 5,159,887 A | * 11/1992 | Poll | A01C 11/02 |
| | | | 172/519 |

FOREIGN PATENT DOCUMENTS

| | | | |
|---|---|---|---|
| FR | 984701 A | | 7/1951 |
| JP | 2003102212 A | * | 4/2003 |
| WO | 87/04585 A1 | | 8/1987 |

OTHER PUBLICATIONS

Written Opinion of International Searching Authority for BE 202305054, completed on Jul. 11, 2023, 6 pages.

* cited by examiner

*Primary Examiner* — Matthew R Buck
(74) *Attorney, Agent, or Firm* — FRESH IP PLC; Clifford D. Hyra; Aubrey Y. Chen

(57) ABSTRACT

Disclosed herein is a planting disc for a disc planter, including a flexible disc-shaped member with a peripheral edge and an inner surface and outer surface. The inner surface of the planting disc includes a contact-pressure lip which is raised in relation to the inner surface and which is arranged in such a way that a groove is formed between the contact-pressure lip and the peripheral edge. Also disclosed herein is a set of two planting discs for a disc planter.

5 Claims, 6 Drawing Sheets

1

PLANTING DISC FOR A DISC PLANTER

FIELD OF THE DISCLOSURE

The present disclosure relates firstly to a planting disc for a disc planter, comprising a flexible disc-shaped member with a peripheral edge and an inner surface and outer surface. Secondly, the present disclosure relates to a set of two planting discs for a disc planter.

Furthermore, the present disclosure relates to a disc planter for putting planting material in soil, comprising a frame which is movable in a direction of travel, optionally suppliers for supplying the planting material to be planted, and rotatable planters which are fitted to the frame and which are intended for gripping planting material and for putting it in the soil.

BACKGROUND

Planting machines whereby plants are put on a field in such a way that one portion of the plants extends below ground and one portion of the plants extends above ground are used for putting planting material, such as for example seedlings, plant cuttings, saplings, shrubs, bulbs which have already partially come out, etc., on a field. Putting plants on a field may also be referred as "planting plants on a field" or "transplanting plants onto the field". A planting machine may therefore be referred to as "transplanting machine". When the plants are put on the field, there is already a portion of the plants which is intended to extend primarily above ground, and, when said plants are put on the field, it will be ensured that said portion therefore extends primarily above ground. If plants whose seeds are relatively expensive, such as cauliflower, broccoli, tomatoes, celery, onions, lettuce, leeks, etc., are grown, use is frequently made of planting material in the form of seedlings. Seedlings are normally obtained by putting a seed in a ball of earth and allowing this seed to germinate until a seedling is formed. The ball of earth with the seedling is then planted by the planting machine on the field, and it is often the case that the plants are harvested individually (one by one) after their growing period. Instead of seedlings, the planting material may also consist of plants without a ball of earth, also known as "bare root plants".

Different types of planting machines for putting planting material in the soil are already known. Such planting machines are made up of a self-driven or trailed frame that is provided with a furrow opener for providing one or more parallel furrows in the soil. Furthermore, provision is often also made of suppliers for supplying the planting material to be planted, a mechanism for placing individual plants in the furrows provided, and a system in the form of pressure rolls or pressure wheels by which the furrows are closed off again. The planting mechanism in the case of a so-called disc planter (also known as disc planting machine) comprises rotatable planters in the form of two planting discs which are placed in relation to one another in such a way that they contact one another at the front side. A plant is inserted (placed) between the discs, with the roots in the outward direction, at the place where the two discs contact one another. The placement of the plants between the discs may occur manually or automatically. The rate at which the plants are placed between the planting discs and the rotational speed of the rotatable planters determine the plant spacing.

The first generation of planting discs for the known disc planters were made of metal, such as steel, aluminium, etc.

In order not to damage the plants, those sides of the planting discs directed towards one another (the inner surfaces thereof) were covered with foam rubber. A disadvantage of this solution is that the quality of the foam rubber, in particular the flexibility thereof, decreases over time as a result of the frequent contact with moisture and earth, whereby the planting discs have to be replaced in order to avoid damage to the plants.

Another solution consists in manufacturing the planting discs completely from a flexible plastic material. It is often the case here that planting discs made of SBR, natural rubber, EPDM or a similar material are opted for. In order not to damage the plants, it is known to, as illustrated in FIG. 1, provide the inner surfaces of the planting discs (denoted by ref. numeral "1") with a concentrically extending contact-pressure profile of hollow form that is positioned in such a way that the plants, when they are between the planting discs, press against the respective contact-pressure profiles. Said contact-pressure profiles are hollow tubular bodies (hose) which are adhesively bonded in a concentric cutout provided in the inner surface of the planting disc. However, this solution is expensive because each contact-pressure profile needs to be manually adhesively bonded in the cutout. Furthermore, the contact surface is situated at a short distance from the peripheral edge, whereby the plants are taken slightly further by the planting discs, which, for the planting material, frequently for plants having curves and folds, can lead to an incorrect plant spacing and/or an incorrect plant depth.

French patent publication FR 984 701 A describes a planting disc for a disc planter that comprises a one-part disc-shaped member manufactured in one piece from a flexible rubber material and with a peripheral edge and an inner surface and outer surface.

American patent publication U.S. Pat. No. 2,348,787 A and international patent publication WO 87/04585 A1 also describe a planar one-part disc-shaped member for a planting machine. The planting machine described in U.S. Pat. No. 2,348,787 A also comprises pressing rolls which ensure that the clamping takes place over a limited area and with controlled force.

SUMMARY

It is an object of embodiments of the present invention to provide a planting disc which can be produced in a simple and economical manner and which allows planting material to be carried along and to be planted without said planting material being damaged.

The object may be achieved by providing a planting disc for a disc planter that comprises a flexible disc-shaped member with a peripheral edge and an inner surface and outer surface, wherein the inner surface of the planting disc comprises a contact-pressure lip which is raised in relation to the inner surface and which is arranged in such a way that a groove is formed between the contact-pressure lip and the peripheral edge. Such a planting disc offers the advantage of being simple to produce. Moreover, no damage to the planting material processed by way of the planting discs will occur due to the specific shaping. This is due to the flexibility of the contact-pressure lip. An additional advantage is also that the plants are gripped at the location of the peripheral edge of the disc-shaped member, whereby the planting material, in the case of seedlings, are taken closer to the ball of earth. In particular in the case of plants having curves and folds, such a planting disc ensures that the plant spacing and plant depth are more accurate.

In a preferred embodiment of the planting disc according to embodiments of the invention, said flexible disc-shaped member is a one-part member. Preferably, the planting disc is made of a rubber-like material. Preference is given to a planting disc made of natural rubber (NBR), SBR, EPDM or thermoplastic materials.

The planting disc according to embodiments of the invention is produced with the aid of a mould. Said mould is designed in such a way that the planting disc is a one-part member, with the contact-pressure lip being obtained in the same operation as the rest of the planting disc. Consequently, in contrast to the known planting disc shown in FIG. 1, there is no need for any further operation to occur in order for the contact-pressure lip to be provided. This ensures a better product in terms of quality. There is no need for adhesive bonding to occur, which is a work-intensive and thus expensive process step. The fact that the production of the planting disc with contact-pressure lip can occur in one operation means that highly accurate positioning of the contact-pressure lip is ensured.

The contact-pressure lip is intended for direct contact with the planting material to be planted. In a preferred embodiment, the contact-pressure lip may also extend to beyond the peripheral edge of the planting disc. The contact-pressure lip is preferably positioned at an angle of 45 degrees. Other angles are also possible, such as for example an embodiment in which the contact-pressure lip is arranged at an angle of 30 degrees in relation to the inner surface of the planting disc.

The spring force of the contact-pressure lip is influenced by the angle, the height and the thickness of the contact-pressure lip, and by the elasticity (flexibility) of the material of the planting disc that is used.

In a more preferred embodiment of the planting disc according to embodiments of the invention, the inner surface of the planting disc further comprises an intermediate lip which is raised in relation to the inner surface and which is arranged in the groove between the contact-pressure lip and the peripheral edge. Such a planting disc comprises two grooves situated next to one another that are separated from one another by the intermediate lip. Such a planting disc with a double contact-pressure lip makes it possible to accommodate a greater amount of play. When using a set of two such planting discs, these can be placed further apart. Thus, planting material with larger stem thicknesses can also be planted by way of such planting discs.

Another subject of embodiments of the present invention relates to a set of two planting discs for a disc planter, wherein at least one of the planting discs comprises a flexible disc-shaped member with a peripheral edge and an inner surface and outer surface, wherein the inner surface of at least one of the planting discs comprises a contact-pressure lip which is raised in relation to the inner surface and which is arranged in such a way that a groove is formed between the contact-pressure lip and the peripheral edge, and wherein the contact-pressure lip is situated on the inwardly facing side of the planting disc. The planting discs of the set are preferably planting discs according to embodiments of the invention as described in the patent text and the detailed description. In an alternative embodiment, one planting disc of the set is a fixed disc, while the other planting disc of the set is a planting disc according to embodiments of the invention.

Embodiments of the present invention furthermore relate to a disc planter for putting planting material in soil, comprising a frame which is movable in a direction of travel, optionally suppliers for supplying planting material to be planted, and rotatable planters which are fitted to the frame and which are intended for gripping the planting material and for putting it in the soil, wherein said planters comprise at least one set of two planting discs according to embodiments of the invention. The suppliers preferably comprise a transport device which is suitable for automatic supply of the planting material. In an alternative embodiment, the suppliers may be replaced by an operator who manually puts the planting material between the planting discs.

The use of the planting disc according to embodiments of the invention as described in the present patent text for an agricultural device, in particular a planting device or harvesting device, such as for example harvesting devices in which the plant has to undergo a rotational movement, as known in the case of leeks, celery, etc., also falls within the scope of the present invention.

BRIEF DESCRIPTION OF THE DRAWINGS

The present invention will now be explained in more detail by means of the following detailed description of a preferred embodiment of a planting machine and a method according to the present invention. The sole aim of this description is to give illustrative examples and to indicate further advantages and features, and can thus by no means be interpreted as a limitation of the area of application of the invention or of the patent rights defined in the claims.

Reference numerals are used in the present description to refer to the attached drawings, in which.

DETAILED DESCRIPTION

Figure 1:
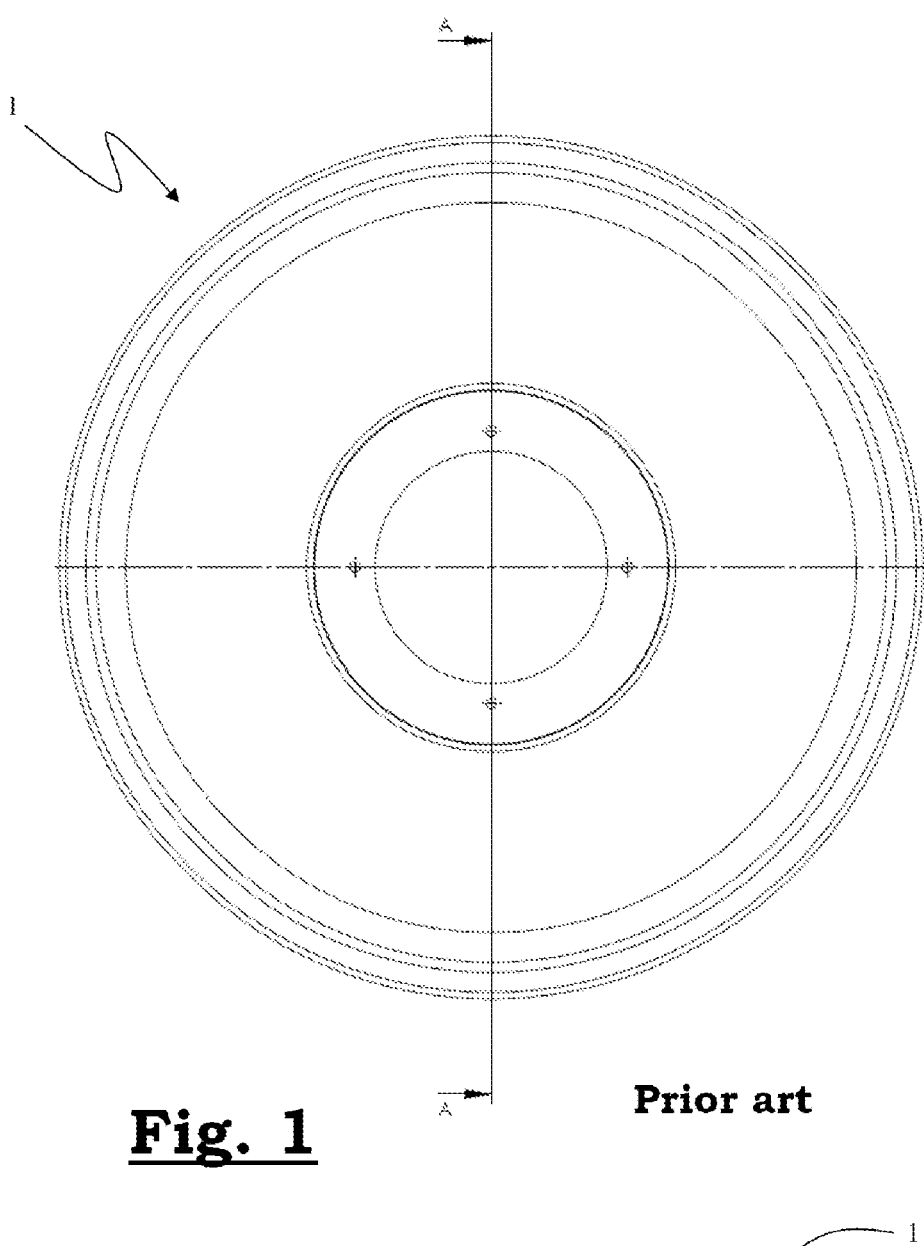
FIG. 1 is a plan view of a planting disc known from the prior art.
Figure 2:
FIG. 2 is a view along the section A-A shown in FIG. 1.
Figures 3, 4:
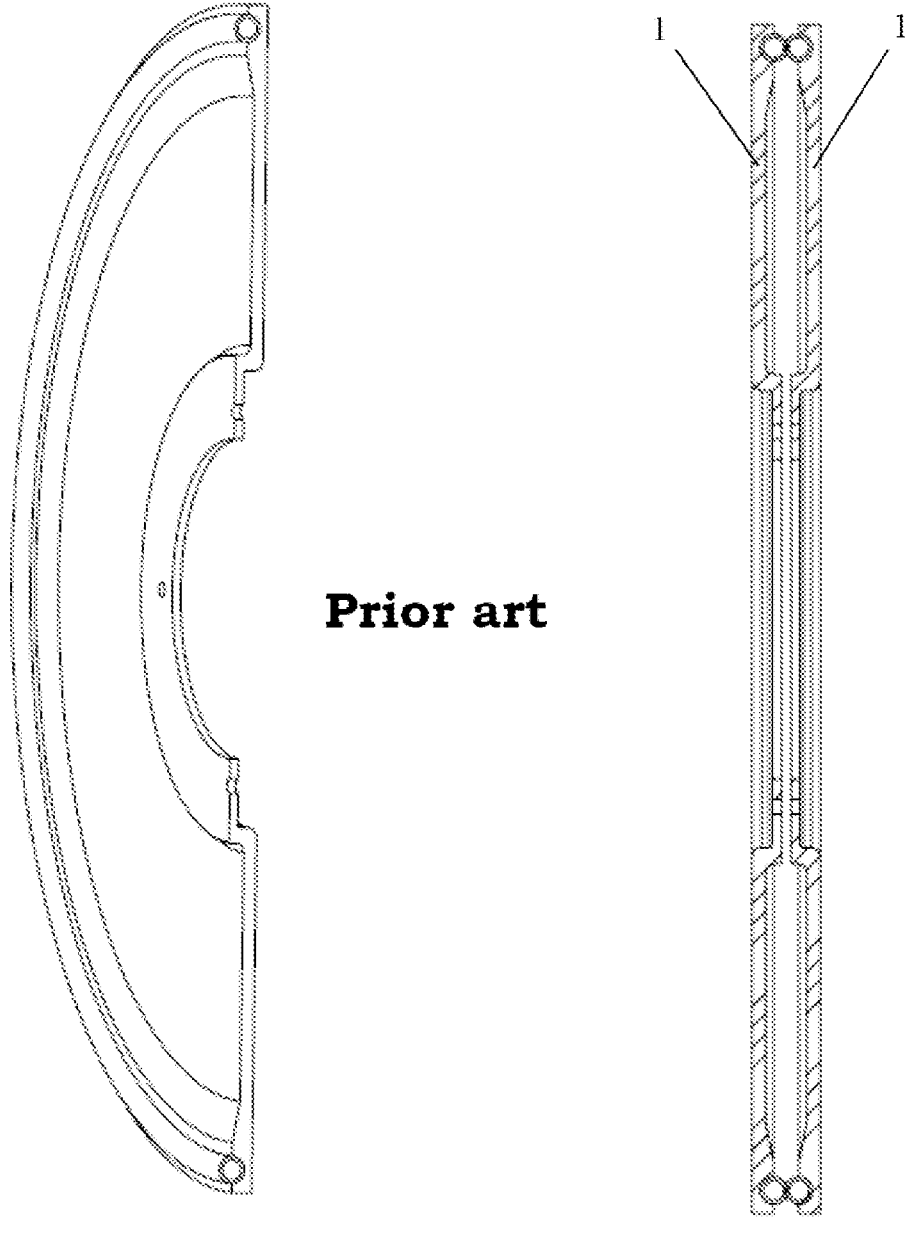
FIG. 3 is a perspective illustration of a planting disc known from the prior art that has been cut in half.
FIG. 4 shows a cross section of an assembly of two planting discs according to the prior art.
Figures 5, 6:
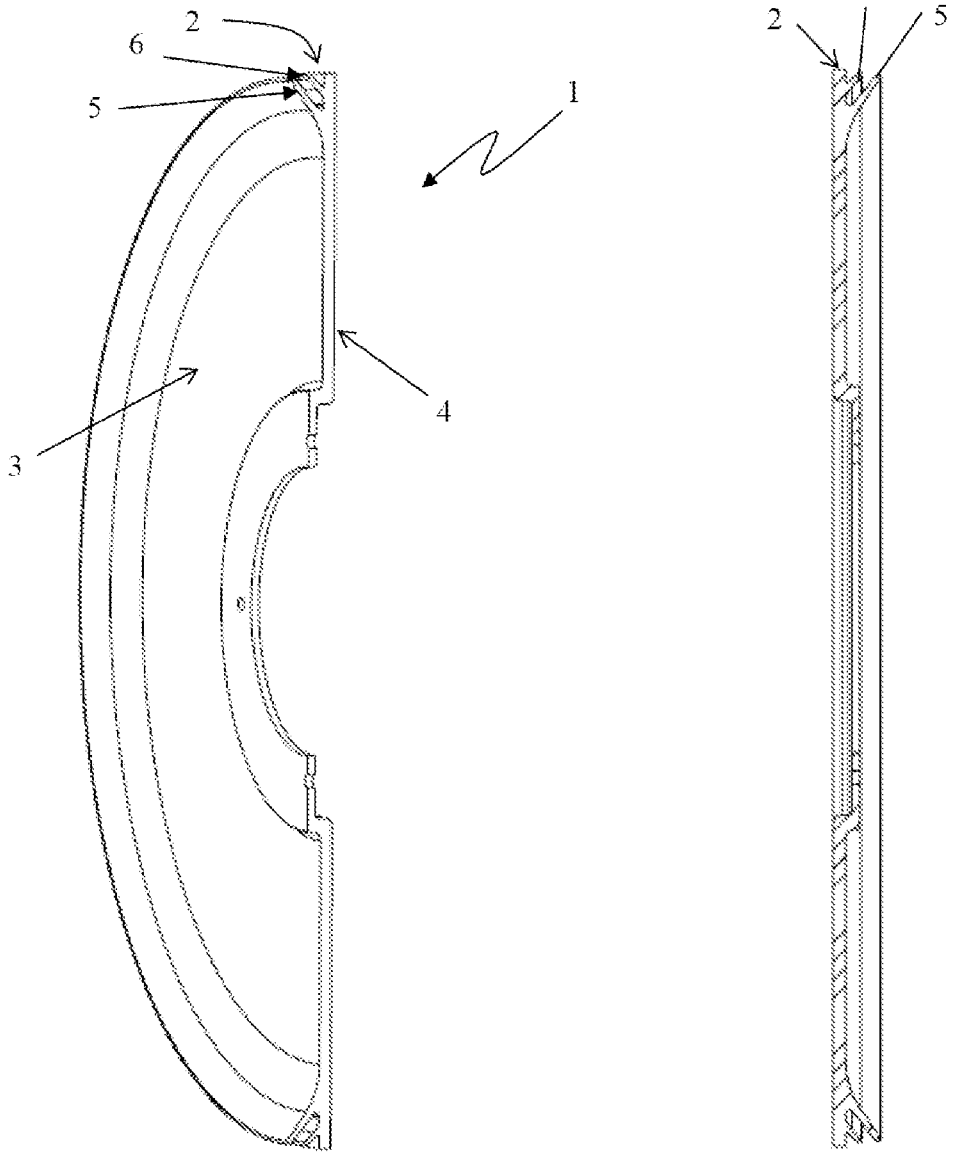
FIG. 5 is a perspective illustration of a planting disc according to at least one embodiment of the invention that has been cut in half.
FIG. 6 shows a cross section of the planting disc shown in FIG. 5.
Figure 8:
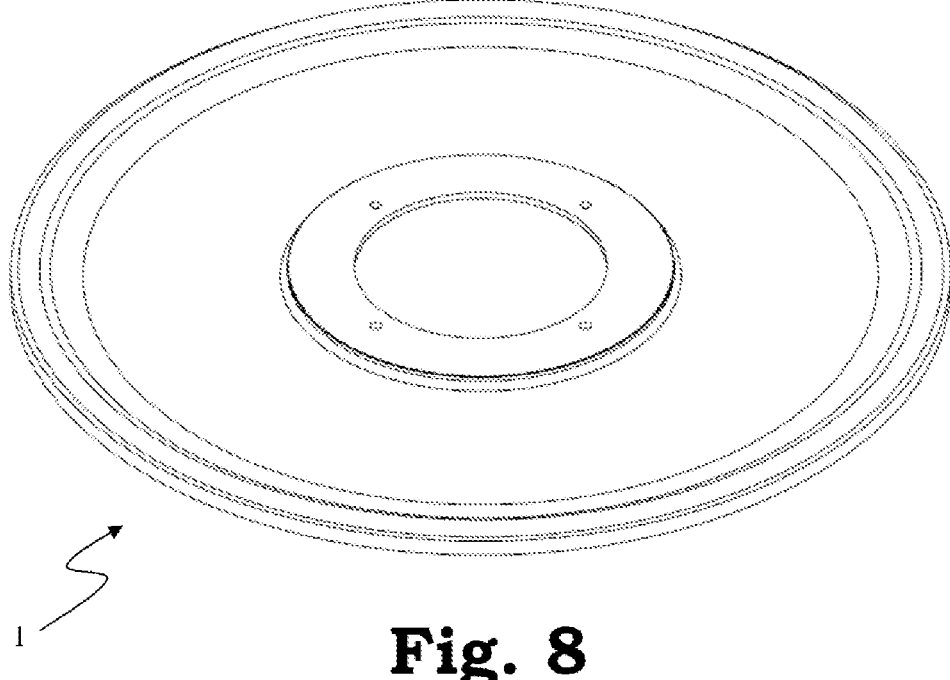
FIG. 8 is an illustration of the planting disc according to at least one embodiment of the invention.

Embodiments of the present invention relate to a planting disc (1), as inter alia illustrated in FIGS. 5, 6 and 8, which allows planting material to be carried along and to be planted without said planting material being damaged. The planting disc (1) according to embodiments of the invention comprises for this purpose a flexible disc-shaped member with a peripheral edge (2) and an inner surface (3) and outer surface (4). The inner surface (3) of the planting disc (1) is provided with a contact-pressure lip (5) which is raised in relation to the inner surface (3) and which is arranged in such a way that a groove is formed between the contact-pressure lip and the peripheral edge. The depth of the groove is determined primarily by the planting material to be processed. The groove has as standard a depth of 10 mm but, if necessary, may also be 20 mm or 25 mm deep.

5 6

Figure 7:
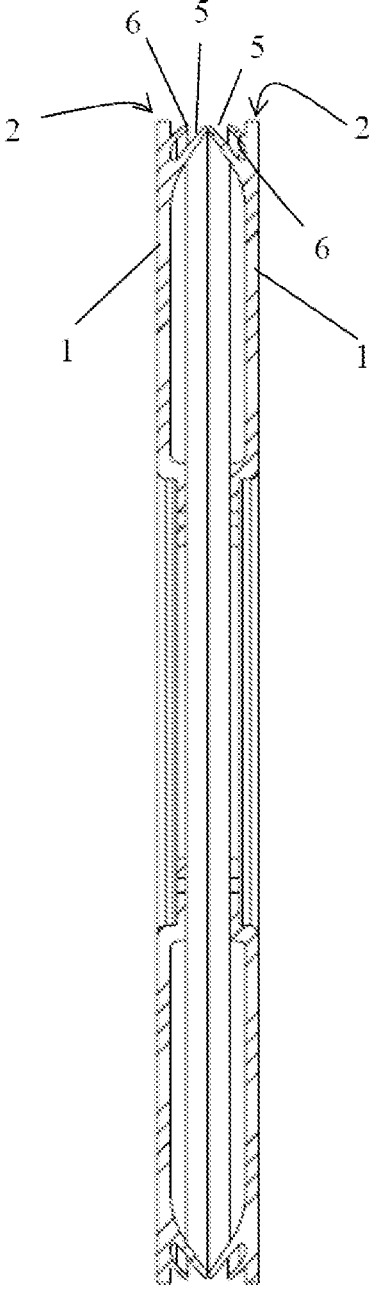
FIG. 7 shows a cross section of an assembly of two planting discs according to at least one embodiment of the invention.

The inner surface (3) of the proposed planting disc (1) further, as can be seen from FIGS. 5 to 7, comprises an intermediate lip (6) which is raised in relation to the inner surface (3) and which is arranged in the groove between the contact-pressure lip (5) and the peripheral edge (2). Such an intermediate lip (6) divides the above-described groove into two, so that two (intermediate) grooves situated next to one another are formed. Such a planting disc (1) has a double contact-pressure lip, namely the contact-pressure lip denoted by reference numeral 5 and the intermediate lip denoted by reference numeral 6. Such a design makes it possible to accommodate a greater amount of play. When using a set of two such planting discs (1) (see FIG. 7), these planting discs can be placed further apart. Thus, planting material with larger stem thicknesses can also be planted by way of such planting discs.

Figure 9:
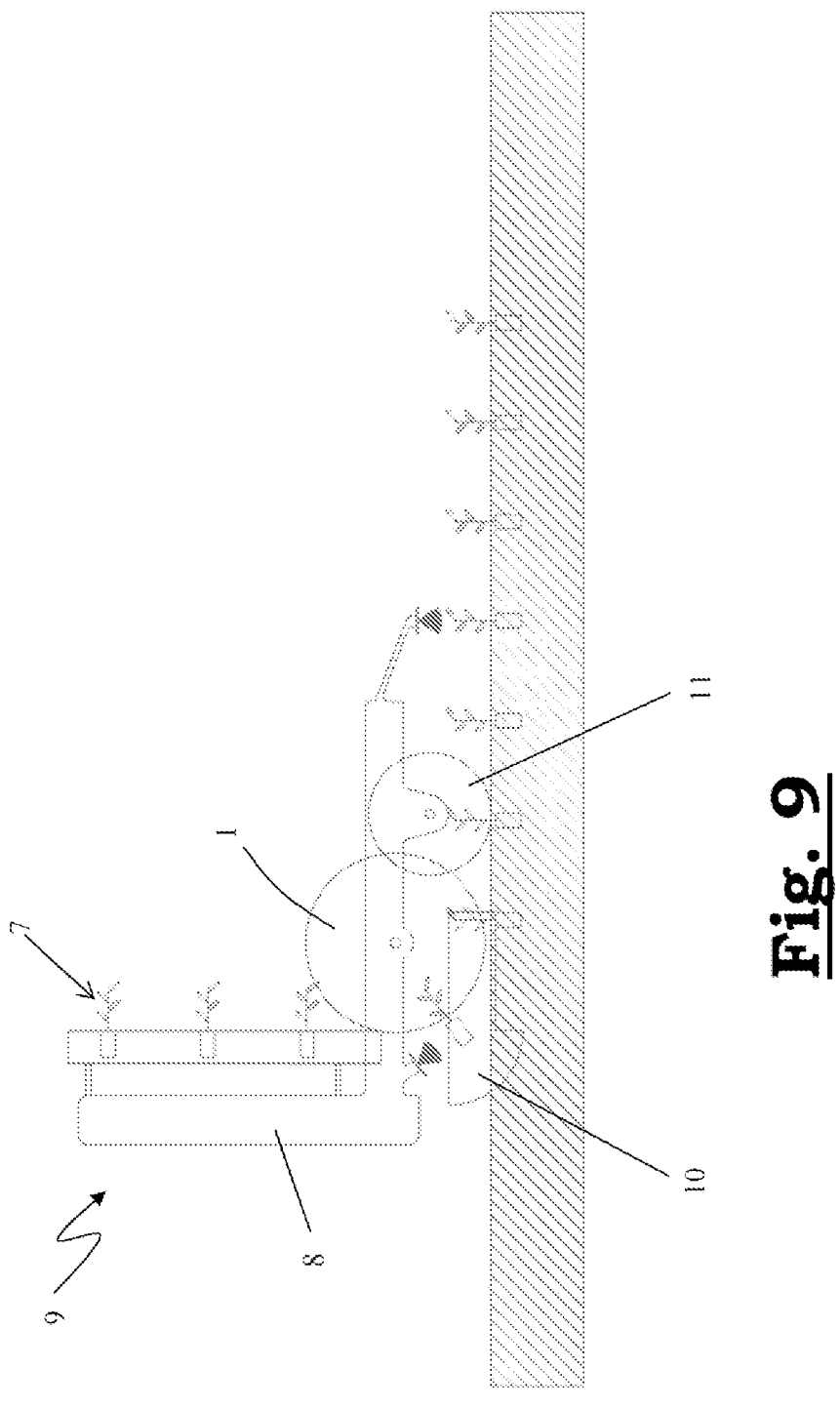
FIG. 9 is a schematic illustration of a disc planter provided with a set of planting discs according to at least one embodiment of the invention.

The planting disc (1) according to embodiments of the invention has been designed specifically for a planting device, in particular a so-called disc planter (9) (see FIG. 9), which is equipped for putting planting material (7) in soil. Such a planting device comprises a self-driven or trailed frame (8), which forms the base of the device. The frame (8) is moved over the soil and, for this purpose, comprises running wheels. The frame is provided with a furrow opener (10) for providing one or more parallel furrows in the soil, and optionally with suppliers for supplying planting material (7) to be planted, planters for placing individual plants in the furrows provided and pressure rolls (11) (or pressure wheels) by which the furrows are closed off again after the planting material has been put in place. The furrow opener (10) is made up of a V-shaped element which is brought partially into the soil during use. If no specific suppliers are provided, then the planting material may also be placed manually between the set of planting discs (1).

The planters, preferably in the form of a set of two planting discs (1) (e.g., disc-shaped members) according to embodiments of the invention, are rotatable in relation to the frame and are intended for gripping the supplied planting material and for putting it in the soil. There is such a mutual relative positioning that, along part of the periphery of both discs at certain places, an intermediate spacing is created for the planting material to be put in a receiving area between the discs and for the planting material, in a delivery area, to be dropped from the planters into a furrow provided in the soil. In order for the planting material to be moved from the receiving area to the delivery area, the two discs are pressed against one another via a contact-pressure device (e.g., slide), provided for this purpose, over another part of the periphery, so that it is possible for the placed planting material to be clamped and moved.

The invention claimed is:

1. A disc planter for putting planting material in soil, comprising a frame which is movable in a direction of travel, and rotatable planters which are fitted to the frame and which are configured for gripping the planting material and for putting the planting material in the soil, wherein the rotatable planters comprise at least one of a set of two planting discs,
   wherein at least one of the two planting discs comprises a flexible disc-shaped member with a peripheral edge and an inner surface and an outer surface, wherein the inner surface of the at least one of the two planting discs comprises a contact-pressure lip which is raised in relation to the inner surface and which is arranged in such a way that a groove is formed between the contact-pressure lip and the peripheral edge, and wherein the contact-pressure lip is situated on an inwardly facing side of the at least one of the two planting discs.

2. The disc planter according to claim 1, wherein the flexible disc-shaped member is a one-part member.

3. The disc planter according to claim 1, wherein the inner surface of the planting disc further comprises an intermediate lip which is raised in relation to the inner surface and which is arranged in the groove between the contact-pressure lip and the peripheral edge.

4. The disc planter according to claim 1, wherein the at least one of the two planting discs is made of a rubber-like material.

5. The disc planter according to claim 1, further comprising suppliers for supplying the planting material to be planted.

* * * * *